United States Patent
Dahle et al.

(10) Patent No.: US 11,197,580 B2
(45) Date of Patent: Dec. 14, 2021

(54) OUTDOOR COOKING STATION WITH RANGE PORTION AND METHOD THEREOF

(71) Applicant: North Atlantic Imports, LLC, Logan, UT (US)

(72) Inventors: Roger Dahle, Providence, UT (US); Jeffrey D. Clark, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 335 days.

(21) Appl. No.: 16/520,744

(22) Filed: Jul. 24, 2019

(65) Prior Publication Data

US 2020/0008615 A1      Jan. 9, 2020

Related U.S. Application Data

(63) Continuation-in-part of application No. 15/885,313, filed on Jan. 31, 2018, now Pat. No. 10,588,461.

(60) Provisional application No. 62/703,353, filed on Jul. 25, 2018.

(51) Int. Cl.
  *A47J 37/06*   (2006.01)
  *A47J 37/07*   (2006.01)
  *A47B 31/00*   (2006.01)
  *A47J 47/00*   (2006.01)

(52) U.S. Cl.
  CPC ......... *A47J 37/067* (2013.01); *A47J 37/0704* (2013.01); *A47J 37/0786* (2013.01); *A47B 2031/003* (2013.01); *A47J 47/005* (2013.01)

(58) Field of Classification Search
  CPC ................ A47J 37/0786; A47J 2037/0795
  See application file for complete search history.

(56) References Cited

U.S. PATENT DOCUMENTS

| | | | |
|---|---|---|---|
| D181,149 S * | 10/1957 | Hoffstein | D23/362 |
| 3,763,846 A | 10/1973 | Schantz | |
| 3,789,822 A | 2/1974 | Schantz | |
| 3,972,318 A * | 8/1976 | Lenoir | A47J 37/10 126/348 |
| 4,321,857 A | 3/1982 | Best | |
| 4,458,585 A * | 7/1984 | Erbach | A47J 37/0786 211/181.1 |
| 4,696,282 A | 9/1987 | Incitti | |
| 4,757,755 A | 7/1988 | Sarten | |
| 4,905,664 A | 3/1990 | Dunham | |
| 5,243,961 A * | 9/1993 | Harris | F24C 1/16 126/25 R |
| 5,520,098 A * | 5/1996 | Fabrikant | A47J 37/0694 220/491 |
| 5,558,009 A * | 9/1996 | Fabrikant | A47J 37/0694 99/394 |
| 5,765,543 A | 6/1998 | Hopkins | |

(Continued)

*Primary Examiner* — David J Laux
(74) *Attorney, Agent, or Firm* — David L. Stott

(57) ABSTRACT

Embodiments of an outdoor cooking station having heating elements extending to define a griddle portion and a range portion of the cooking station. The griddle portion may include a griddle covered with a hood pivotably mounted to the griddle. The range portion may include a grate with heating elements sized to heat, for example, fluids in a receptacle on the cooking station. Further, the grate of the range portion may be sized and configured to removably secure a cage for safely holding and maintaining the receptacle over the grate.

20 Claims, 7 Drawing Sheets

(56) References Cited

U.S. PATENT DOCUMENTS

| | | | |
|---|---|---|---|
| 5,782,173 A * | 7/1998 | Fabrikant | A47J 37/0694 |
| | | | 220/485 |
| 5,839,361 A | 11/1998 | Richter | |
| 5,970,856 A * | 10/1999 | Fabrikant | A47J 37/0694 |
| | | | 220/491 |
| 6,189,528 B1 | 2/2001 | Oliver | |
| 6,640,800 B1 | 11/2003 | Hodgson et al. | |
| 6,820,538 B2 | 11/2004 | Roescher | |
| D694,056 S | 11/2013 | Dahle | |
| 9,204,754 B1 * | 12/2015 | Bourgeois | A47J 37/0611 |
| 9,709,281 B2 | 7/2017 | Ahmed | |
| 2006/0081236 A1 * | 4/2006 | Johnston | A47J 37/0786 |
| | | | 126/25 R |
| 2008/0034980 A1 * | 2/2008 | Nardone | A47J 37/041 |
| | | | 99/419 |
| 2008/0164258 A1 * | 7/2008 | Raichlen | A47J 37/0786 |
| | | | 220/485 |
| 2008/0236564 A1 | 10/2008 | Burtea et al. | |
| 2009/0020491 A1 * | 1/2009 | Foster | A47J 37/0786 |
| | | | 211/181.1 |
| 2014/0224750 A1 * | 8/2014 | Vogds | A47J 37/0664 |
| | | | 211/13.1 |
| 2015/0342399 A1 * | 12/2015 | Tee | A47J 37/07 |
| | | | 99/445 |
| 2016/0007622 A1 * | 1/2016 | Bowyer | A47J 37/0786 |
| | | | 99/482 |
| 2017/0370593 A1 * | 12/2017 | Kohli | A47J 37/0704 |
| 2018/0220845 A1 | 8/2018 | Dahle | |

\* cited by examiner

OUTDOOR COOKING STATION WITH RANGE PORTION AND METHOD THEREOF

CROSS-REFERENCE TO RELATED APPLICATIONS

This application claims the benefit of U.S. Provisional Application No. 62/703,353, filed Jul. 25, 2018, the disclosure of which is hereby incorporated by reference herein in its entirety. Further, this application is a continuation-in-part of U.S. patent application Ser. No. 15/885,313, filed Jan. 31, 2018, the disclosure of which is hereby incorporated by reference herein in its entirety.

TECHNICAL FIELD

The present invention relates generally to outdoor type cooking stations and, more specifically, the present invention relates to outdoor cooking stations with griddle and range portions for cooking and safety components thereof.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

Another mode similar to grilling is cooking with a griddle. The griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame. One of the perceived challenges to griddle type cooking stations relates to the maintenance of the cooking surface of the griddle.

Further, another mode of cooking that imparts unique flavors to food is deep frying the food with, for example, cooking oil. One mode for deep frying food is in a receptacle over a range type cooking station. However, those desiring to cook food with a griddle and also a range type cooking station are often limited by the space available on their back patio or deck and, therefore, will likely choose one or the other types of cooking stations. Further, those desiring to deep fry food over a range type cooking station with oil, for example, in the receptacle, are faced with a potential safety issue of the receptacle spilling the oil over the open flame of the cooking station.

BRIEF SUMMARY OF THE INVENTION

The present invention is directed to various embodiments of an outdoor cooking station for heating a cooking fluid. The outdoor cooking station includes a main body and a cage. The main body includes one or more heating elements supported by the main body. Further, the main body including an upper portion sized and configured to support a grate, the grate positioned over the upper portion so as to be disposed above the one or more heating elements. The cage is sized and configured to cooperate with and be positioned over the grate in a use-state. The cage includes vertically and horizontally extending components configured to hold a receptacle within the cage. Further, the cage includes a base portion with base extensions each extending downward from the base portion such that the base extensions, in the use-state, are sized and configured to extend along an inner surface of the grate with two of the base extensions sized and configured to extend along an underside surface of the grate.

In another embodiment, upon the cage being positioned over the grate in the use-state, the cage is minimized to initial movement relative to the grate to generally pivot about an axis defined along the two of the base extensions. In another embodiment, upon the cage being positioned over the grate in the use-state, the base extensions extend along the inner surface and the underside surface of the grate to minimize movement of the cage relative to the grate. In another embodiment, the base extensions each extend to define an underside ledge, the underside ledge sized and configured to be positioned over an upward facing surface of the grate. In still another embodiment, the base extensions and the base portion of the cage are a monolithic, seamless structure.

In another embodiment, the upper portion of the main body extends to support a griddle member thereon. In still another embodiment, the upper portion of the main body extends to support the grate and a griddle member thereon in a side-by-side manner. In a further embodiment, the main body includes a first side shelf and a second side shelf attached to respective opposite first and second sides of the main body, the first side shelf positioned adjacently alongside the griddle member, the second side shelf positioned adjacently alongside the grate. In yet another embodiment, the main body includes a first side shelf and a second side shelf secured to respective opposite first and second sides of the main body such that an upward facing surface of the first and second side shelves is substantially level with an upper end of the upper portion of the main body.

In another embodiment, the grate sits along the upper portion of the main body to define a range cook surface. In another embodiment, the main body includes at least two wheels adjacent a bottom end of the main body to facilitate portability of the main body. In another embodiment, the receptacle is sized and configured to hold the cooking fluid therein.

In accordance with another embodiment of the present invention, an outdoor cooking station with a main body including one or more heating elements supported by the main body, the main body including an upper portion sized and configured to support a grate such that the grate is positioned over the upper portion so as to be disposed above the one or more heating elements. The outdoor cooking station includes a cage sized and configured to cooperate with and be positioned over the grate in a use-state. The cage includes vertically and horizontally extending components configured to hold a receptacle within the cage. The cage includes a base portion with base extensions each extending downward from the base portion such that the base extensions, in the use-state, are sized and configured to extend along an inner surface of the grate with two of the base extensions sized and configured to extend along an underside surface of the grate.

In another embodiment, upon the cage being positioned over the grate in the use-state, the cage is minimized to initial movement relative to the grate to generally pivot about an axis defined along the two of the base extensions. In another embodiment, upon the cage being positioned over the grate in the use-state, the base extensions extend along the inner surface and the underside surface of the grate to minimize movement of the cage relative to the grate. In another embodiment, the base extensions each extend to define an underside ledge, the underside ledge sized and configured to be positioned over an upward facing surface of the grate. Further, in still another embodiment, the base extensions and the base portion of the cage are a monolithic, seamless structure.

In another embodiment, the outdoor cooking station further includes a griddle member sized and configured to be supported by the upper portion of the main body and positioned adjacent the grate in a side-by-side manner. In another embodiment, the outdoor cooking station further includes a first side shelf and a second side shelf secured to respective opposite first and second sides of the main body such that an upward facing surface of the first and second side shelves is substantially level with an upper end of the upper portion of the main body.

In accordance with another embodiment of the present invention, a method for deep frying food on an outdoor cooking station is provided. The method includes the steps of: providing a main body including one or more heating elements supported by the main body, the main body including an upper portion sized and configured to support a grate, the grate positioned over the upper portion so as to be disposed above the one or more heating elements; positioning a cage to cooperate with the grate in a use-state so that base extensions of a base portion of the cage extend along an inner surface of the grate with two of the base extensions extending along an underside surface of the grate; positioning a receptacle within the positioned cage such that the cage includes vertically and horizontally extending components for holding the receptacle within the cage; and heating a cooking fluid within the receptacle with the one or more heating elements for deep frying food.

In another embodiment, the positioning the cage step includes minimizing movement of the cage in the use-state relative to the grate to generally pivot about the two of the base extensions. In another embodiment, the positioning the cage step includes positioning the cage in the use-state with the base extensions extending along the inner surface and the underside surface of the grate to minimize movement of the cage relative to the grate.

In another embodiment, the providing step includes providing a griddle member to be supported on the upper portion of the main body adjacent the grate in a side-by-side manner. In still another embodiment, the providing step includes providing a first side shelf and a second side shelf secured to respective opposite first and second sides of the main body such that an upward facing surface of the first and second side shelves is substantially level with an upper end of the upper portion of the main body.

In accordance with another embodiment of the present invention, an outdoor cooking station is provided. The outdoor cooking station includes a main body, a griddle and a hood. The main body includes an upper portion with one or more heating elements supported by the main body. The griddle is sized and configured to be positioned on an upper edge of the main body such that the griddle is positioned above the one or more heating elements. Further, the griddle defines a flat cooking surface with an upstanding splash guard extending directly upward from the cooking surface along an entire periphery of the cooking surface. The splash guard includes a front splash guard, a rear splash guard, a first splash guard and a second splash guard, the front splash guard extending parallel relative to the second splash guard and the front splash guard extending parallel relative to the rear splash guard. The hood is pivotably coupled to the griddle, the hood moveable between an open position and a closed position.

In one embodiment, the hood is pivotably coupled to the griddle at a rear portion of the first and second splash guards. In another embodiment, the hood pivots about an axis, the axis extending through the griddle. In another embodiment, the hood pivots about an axis defined by a pivotable coupling linking the hood and the griddle. In still another embodiment, the hood pivotably rotates with a pivotable coupling linking the hood and the griddle to move the hood between the open and closed positions. In yet another embodiment, in the closed position, the hood covers the splash guard and the cooking surface of the griddle. In another embodiment, the hood rotates about an axis defined through the griddle. In still another embodiment, the hood rotates about an axis to facilitate the hood to move to the closed position to cover the griddle.

In accordance with another embodiment of the present invention, an outdoor cooking station is provided. The cooking station includes a main body, a griddle and a hood. The main body includes an upper portion with one or more heating elements supported by the main body. The griddle is sized and configured to be positioned on an upper edge of the upper portion of the main body such that the griddle is positioned above the one or more heating elements. Further, the griddle defines a flat cooking surface with an upstanding splash guard extending directly upward from the cooking surface along a periphery of the cooking surface. The hood is pivotably coupled to the splash guard of the griddle such that the hood is moveable between an open position and a closed position such that, in the closed position, the hood covers the cooking surface and the splash guard.

In one embodiment, the hood is pivotably coupled to the griddle at a rear portion of the splash guard. In another embodiment, the hood pivots about an axis, the axis extending through the griddle. In another embodiment, the hood rotates about an axis defined by a pivotable coupling linking the hood and the griddle. In still another embodiment, the hood pivotably rotates with a pivotable coupling linking the hood and the griddle to move the hood between the open and closed positions.

In accordance with another embodiment of the present invention, a method of cooking food with an outdoor cooking station is provided. The method includes the steps of: providing a main body of the cooking station with an upper portion having one or more heating elements supported by the main body; heating a griddle positioned on an upper edge of the upper portion of the main body with the one or more heating elements positioned below the griddle for heating a cooking surface of the griddle, the griddle having an upstanding splash guard extending directly upward from the cooking surface along a periphery of the cooking surface of the griddle; and pivoting a hood coupled to the splash guard of the griddle such that the hood is moveable between an open position and a closed position and, such that, upon the hood being in the closed position, the hood covers the cooking surface and the splash guard.

In one embodiment, the step of pivoting includes pivoting the hood with a pivotable coupling at a rear portion of the splash guard of the griddle. In another embodiment, the step of pivoting includes pivoting the hood about an axis such that the axis extends through the griddle. In still another embodiment, the step of pivoting includes pivoting the hood to rotate about an axis defined by a pivotable coupling linking the hood and the griddle. In another embodiment, the step of pivoting includes pivoting the hood to rotate with a pivotable coupling linking the hood and the griddle to move the hood between the open and closed positions.

In accordance with another embodiment of the present invention, an outdoor cooking station is provided. The outdoor cooking station includes a main body, a griddle, and a hood. The main body includes an upper portion with one or more heating elements supported by the main body, the upper portion of the main body extending to define a griddle portion and a range portion. The griddle is sized and configured to be positioned on an upper edge of the griddle portion of the main body such that the griddle is positioned above the one or more heating elements, the griddle defining a flat cooking surface with an upstanding splash guard extending directly upward from the cooking surface along a periphery of the cooking surface. The hood is at least operatively coupled to the griddle such that the hood is pivotable between an open position and a closed position such that, in the closed position, the hood covers the cooking surface and the splash guard.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
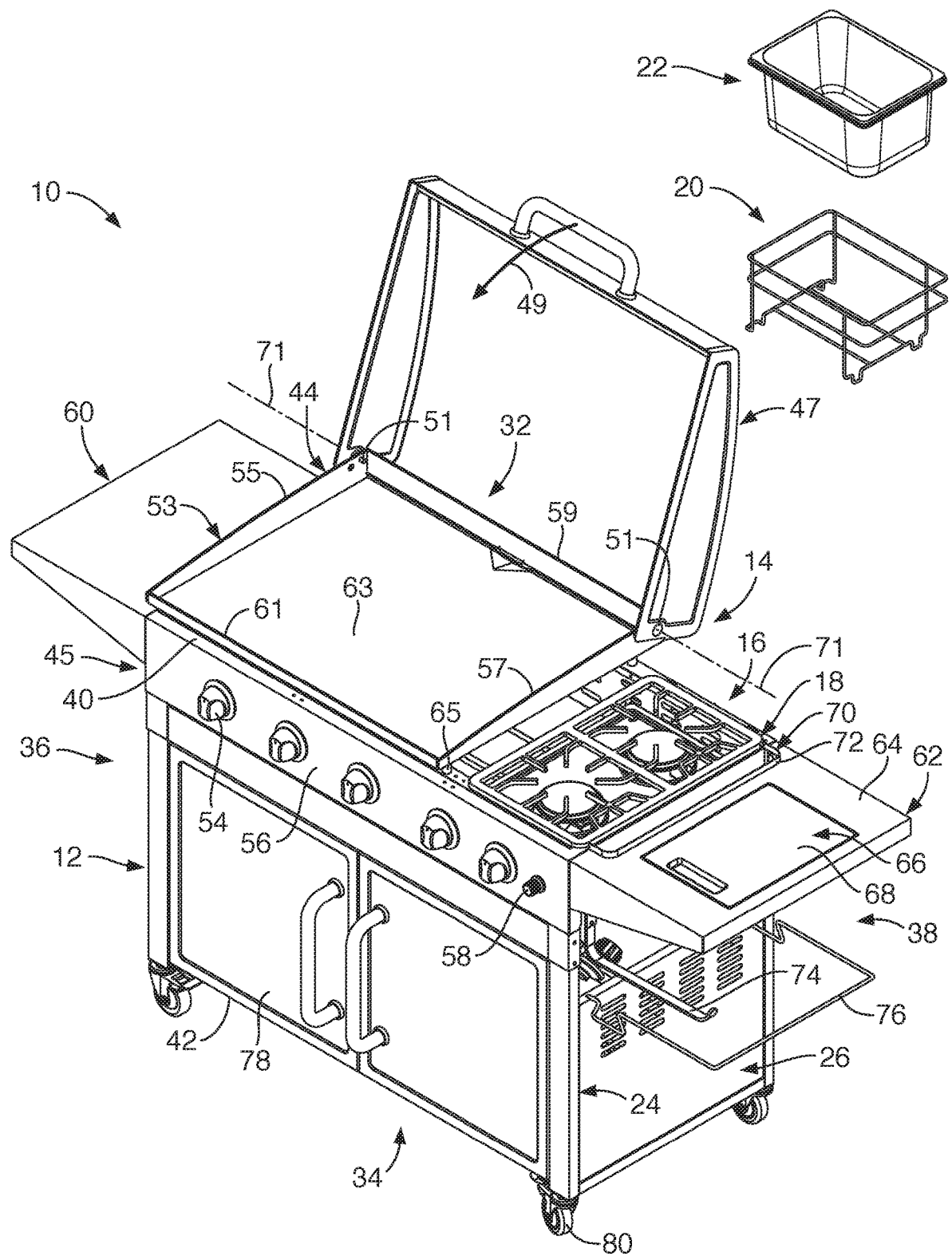
FIG. 1 is a partially exploded perspective view of an outdoor cooking station having both a griddle portion and a range portion, depicting a cage and receptacle associated with the outdoor cooking station, according to an embodiment of the present invention.
Figure 2:
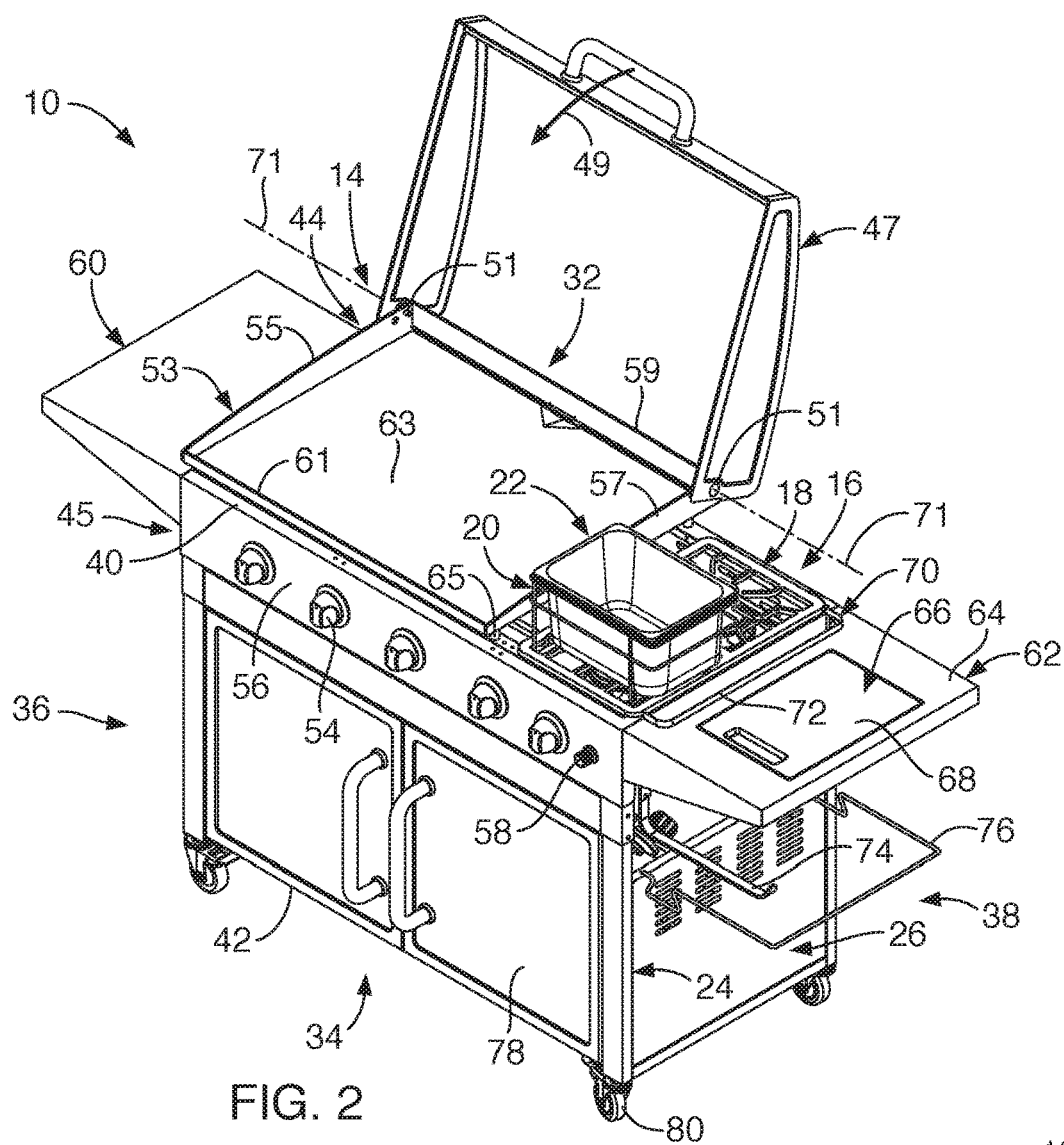
FIG. 2 is a perspective view of the outdoor cooking station of FIG. 1 with the cage and receptacle coupled to the range portion of the outdoor cooking station, according to another embodiment of the present invention.

Referring to FIGS. 1 and 2, a cooking station 10 sized and configured to heat a cooking fluid therewith is provided. The cooking station 10 may be an outdoor cooking station and may include structural characteristics that facilitate portability of the cooking station. In one embodiment, the cooking station 10 may include a main body 12 and structure that facilitates multiple cooking modalities, such as a griddle portion 14 and a range portion 16, positioned side-by-side in the main body 12. The range portion 16 may include a grate 18 positioned therewith that may cooperate with a cage 20. The cage 20 may be sized and configured to be coupled to the grate 18 so that the cage 20 may safely hold a receptacle 22 therein to heat a cooking fluid, such as cooking oil for deep frying food. In this manner, the cooking station 10 may include structure to safely heat cooking fluid while also being able to heat and cook on the griddle portion 14 of the cooking station 10.

Figure 3:
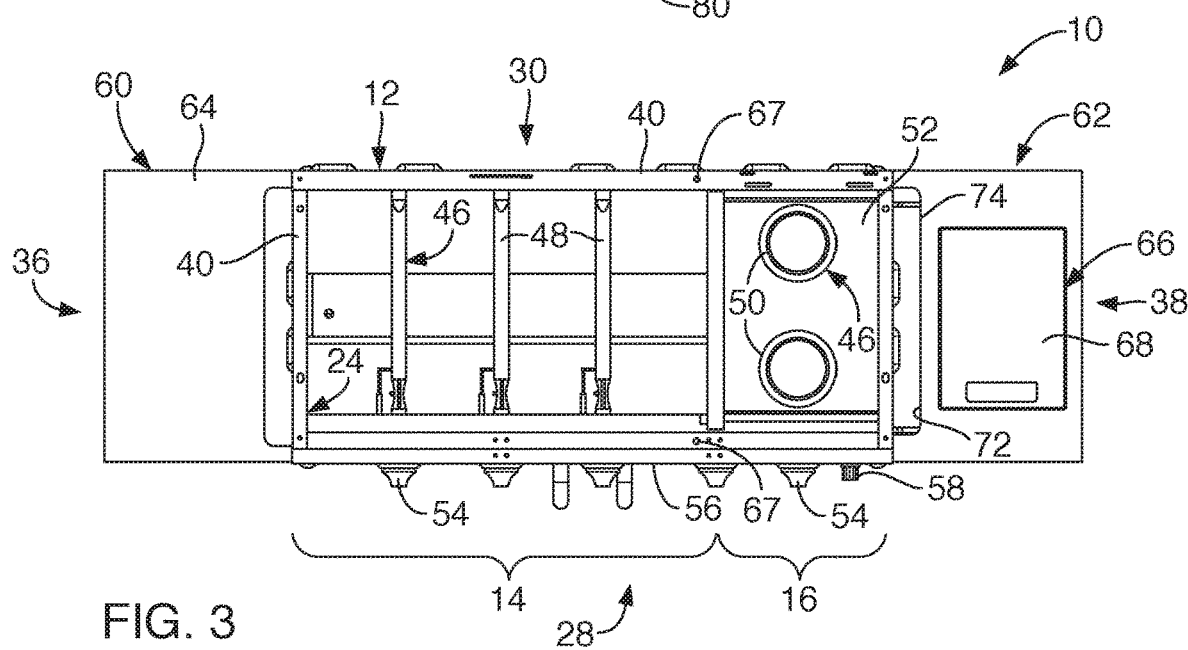
FIG. 3 is a top view of the outdoor cooking station with a griddle member and a grate removed from the cooking station, depicting heating elements coupled to a main body of the outdoor cooking station, according to another embodiment of the present invention.

With reference to FIGS. 1, 2 and 3, the main body 12 of the cooking station 10 may extend with frame components 24 and panels 26 to define a generally box shaped cubical structure. Such main body 12 may define a front side 28, a rear side 30, an upper side 32, a bottom side 34, a first side 36 and a second side 38. The first and second sides 36, 38 may be opposite left and right sides of the main body 12. Similarly, the front side 28 may be opposite the rear side 30 and the upper side 32 may be opposite the bottom side 34. One or more of the sides may include limited panels, such as the rear side 30 or first and second sides 36, 38 of the main body 12, extending between frame components of the main body 12. The frame components 24 and/or panels 26 may extend between the upper and bottom sides 32, 34 to define an upper edge 40 and a lower edge 42 of the main body 12. The upper edge 40 of the main body 12 may extend with a generally rectangular configuration or periphery. The upper edge 40 or structure adjacent the upper edge 40 may be sized and configured to support a griddle member 44 and the grate 18 to define the griddle portion 14 and the range portion 16 of the cooking station 10. Further, the frame components 24 and panels 26 of the main body 12 may extend to define an upper portion 45, the upper portion 45 externally extending downward from the upper edge 40 (or adjacently from the upper edge 40) with a rectangular or square periphery and may include structure for supporting heating elements 46 within the framework or between frame components 24 of the cooking station 10.

Figure 9:
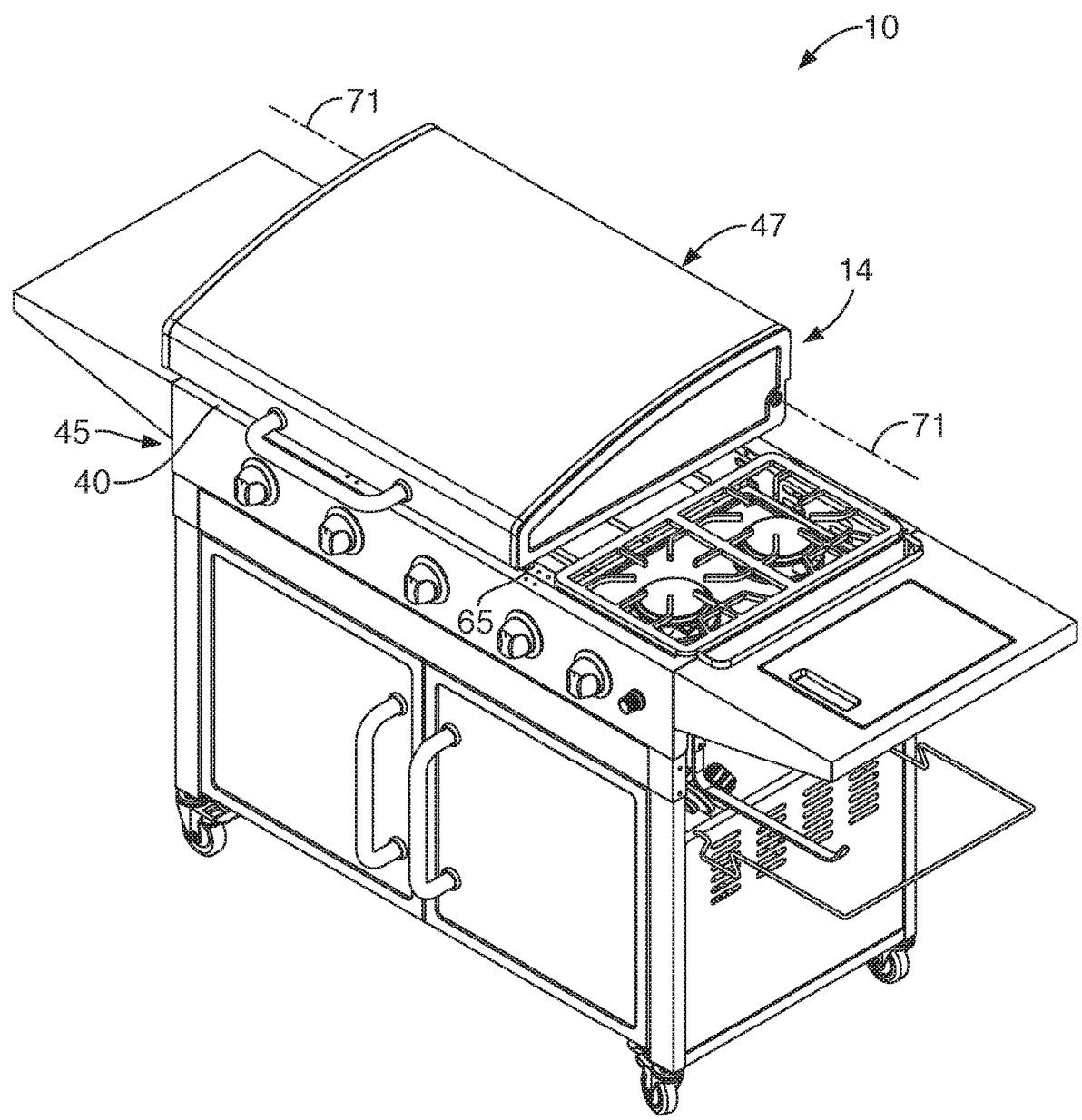
FIG. 9 is a perspective view of the cooking station, depicting a hood of the griddle portion rotated to a closed position, according to another embodiment of the present invention.

With reference to FIGS. 1-3 and 9, the cooking station 10 may include a hood 47 (that may be associated with the griddle portion 14), the hood 47 pivotably coupled to the griddle member 44 so as to be movable between an open position, as depicted in FIGS. 1 and 2, and a closed position, as indicated by arrow 49 and shown in FIG. 9. Upon the hood 47 being moved between the open and closed positions, the hood 47 may rotate or pivot about an axis such that the hood 47 may be coupled to the griddle and/or cooking station with a linkage, such as pivotable coupling 51. Such linkage may be a point linkage, an arm linkage or a dual arm linkage. For example, the hood 47 may be pivotably moved about axis 71 between the open and closed positions via the pivotable coupling 51 or linkage positioned at or at least partially along a rear portion of a splash guard 53 of the griddle member 44. For example, the pivotable coupling 51 may be positioned along the rear portion of oppositely positioned first and second splash guards 55, 57 of the griddle member 44 and adjacent a rear splash guard 59 of the griddle member 44 such that the pivotable coupling 51 rotatably connects a rear portion of the hood 47 to the griddle member 44. Upon moving the hood 47 to the closed position, the hood 47 may cover a top side of the griddle member 44 such that the hood 47 may cover each of the first and second splash guards 55, 57, the rear splash guard 59, as well as a front splash guard 61 of the griddle member 44. Each of the first and second splash guards 55, 57 and rear and front splash guards 59, 61 of the griddle member 44 may extend directly upward from a cooking surface 63 of the griddle member 44. Further, the first splash guard 55 may extend parallel with the second splash guard 57, and the rear splash guard 59 may extend parallel with the front splash guard 61. Further, such griddle member 44 and hood 47 may be readily removed from the upper edge 40 of the main body 12 by simply lifting the griddle legs 65 of the griddle member 44 from apertures 67 (FIG. 3) defined in the upper edge 40 of the main body 12. With this arrangement, the griddle member 44 may be covered with the hood 47 so that heat from the griddle member 44 may be maintained and captured under the hood 47 while cooking, if desired. Further, during periods when the cooking station 10 is not being used, the hood 47 may be moved to the closed position to protect and assist in maintaining the cooking surface 63 of the griddle member 44. In this manner, during periods of non-use, the griddle member 44 may not need to be lifted and removed from the cooking station 10 to be stored separately for proper care of the griddle member, alleviating this potentially strenuous task. The cooking station 10 having the griddle portion 14 and the range portion 16 with the hood 47 pivotably coupled to the griddle member 44 is also disclosed in commonly assigned U.S. Non-Provisional patent application Ser. No. 15/885,313, the disclosure of which is incorporated herein in its entirety.

With reference to FIGS. 1-3, as set forth, the upper portion 45 of the main body 12 of the cooking station 10 may support multiple heating elements 46. For example, the heating elements 46 may include first heating elements 48 and second heating elements 50 that may be sized and configured to facilitate heating the griddle portion 14 and the range portion 16, respectively, of the cooking station 10. For example, for the griddle portion 14, the first heating elements 48, such as three elongated heating elements or three elongated flame burners, may be spaced apart to extend between the front side 28 and the rear side 30 of the main body 12 to be disposed below the griddle member 44. Similarly, the second heating elements 50 for the range portion 16 may include two heating elements or flame burners each spaced apart between the front side 28 and rear side 30 of the upper portion 45 or main body 12 that may be in the form of a circular burner or the like. Also, the range portion 16 may include a range panel 52 disposed slightly below the second heating elements 50 of the range portion 16, the range panel 52 including two openings defined therein sized to correspond with the second heating elements 50 and sized to be supported by the frame components 24 or the like. Further, the range panel 52 may be removable for cleaning purposes.

The front side 28 of the upper portion 45 may include multiple burner control valves 54 or knobs positioned over a front panel 56, each burner control valve 54 associated with one of the respective heating elements 46 of the griddle portion 14 or the range portion 16 of the cooking station 10. Further, the heating elements 46 may extend between the front side 28 and rear side 30 of the main body 12 below the upper edge 40 of the main body 12 such that the heating elements 46 may be secured to the frame components 24 extending within and adjacently along the front and rear sides 28, 30 of the main body 12.

Each of the heating elements 46 may hold structure for feeding pressurized fuel therethrough, such as propane gas or natural gas, and controlled with the burner control valves 54 or knobs, as known to one of ordinary skill in the art. In addition, the front panel 56 may include an ignitor switch 58 that may be depressed to provide a spark to ignite the gas fueled heating elements 46. The cooking station 10 may include various typical components to facilitate igniting the heating elements 46 associated with the griddle portion 14 and/or the range portion 16 of the cooking station 10, such as various valves, tubing, manifold, gas couplings, fasteners, and any other components, as known to one of ordinary skill in the art.

Further, the cooking station 10 may include a propane tank holder (not shown) attached to a lower portion of the main body 12, such as adjacent the first side 36, second side 38, or rear side 30 of the main body 12. The propane tank holder may support a propane tank (not shown) thereon which may be coupled to the cooking station 10 via the typical components for feeding propone to the heating elements 46, as known by one of ordinary skill in the art. Similarly, rather than the cooking station 10 being coupled to a propane tank, components may be employed for coupling the heating elements 46 to a natural gas connection for feeding natural gas through the heating elements 46, as known to one of ordinary skill in the art. With this arrangement, the cooking station 10 may be employed for heating the griddle portion 14 and the range portion 16 for cooking food therewith.

The cooking station 10 may include additional structure associated therewith. For example, in one embodiment, the cooking station 10 may include a first side shelf 60 and a second side shelf 62. Each of the first and second side shelves 60, 62 may be coupled to respective first and second sides 28, 30 of the main body 12. The first and second side shelves 60, 62 may be secured to the main body 12 such that an upward facing surface 64 of the first and second side shelves 60, 62 may be substantially level or substantially flush with the upper edge 40 of the main body 12. In another embodiment, the first and second side shelves 60, 62 may be disposed a predetermined distance below the upper edge 40 of the main body 12. Further, in another embodiment, the first and second side shelves 60, 62 may include various features integrated therewith, such as a cut-out portion sized to hold a removable cutting board 66 therein, the cutting board 66 positioned with an upper surface 68 substantially flush with the upward facing surface 64 of the respective first or second side shelves 60, 62.

Further, in another embodiment, the first and second side shelves 60, 62 may include an elongated opening 70 or recess defined therein with a ridge 72 extending upward adjacent to the elongated opening 70. Such ridge 72 may act as a safety feature for discouraging users of the cooking station 10 to place cooking items too close to the griddle portion 14 or range portion 16 of the cooking station 10. Further, in another embodiment, the first and/or the second side shelf 60, 62 may include an elongated towel holder 74 extending below the respective first and/or second side shelf 60, 62. Also, the first and/or second sides 36, 38 of the main body 12 may exhibit structure for holding a removable waste bag holder 76, the waste bag holder 76 being removably positionable over one of the panels of the first and second sides 36, 38 of the main body 12.

In addition, in another embodiment, the front side 28 of the main body 12 may include one or more cabinet doors 78 with handles positioned below the upper portion 45 of the main body 12, the cabinet doors 78 openable to access storage shelving or the like within the main body 12. In another embodiment, the cooking station 10 may include two or more wheels 80, such as caster wheels, secured to, or adjacent to, the lower edge 42 of the main body 12. Such two or more wheels 80 may facilitate portability of the cooking station 10 so that the cooking station may be readily moved to a desired location. Further, the two or more wheels 80 may include a locking feature to provide stability to the cooking station 10 as desired.

Figure 4:
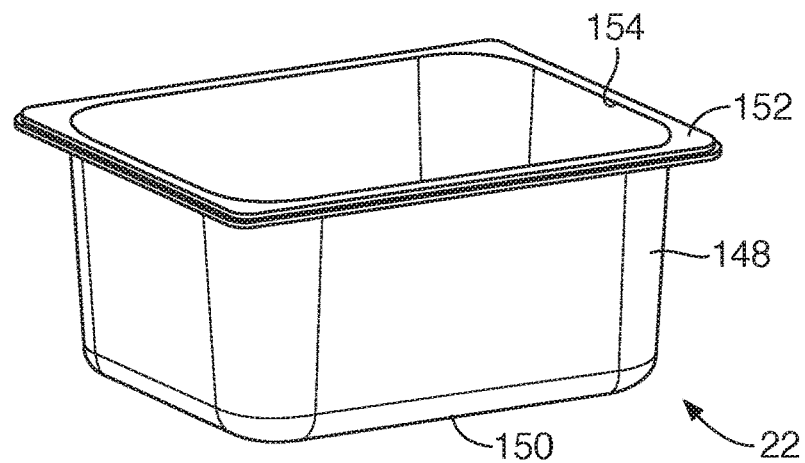
FIG. 4 is an enlarged exploded view of a grate of the range portion, depicting the cage and receptacle in a non-secured state relative to the grate, according to another embodiment of the present invention.
Figure 4:
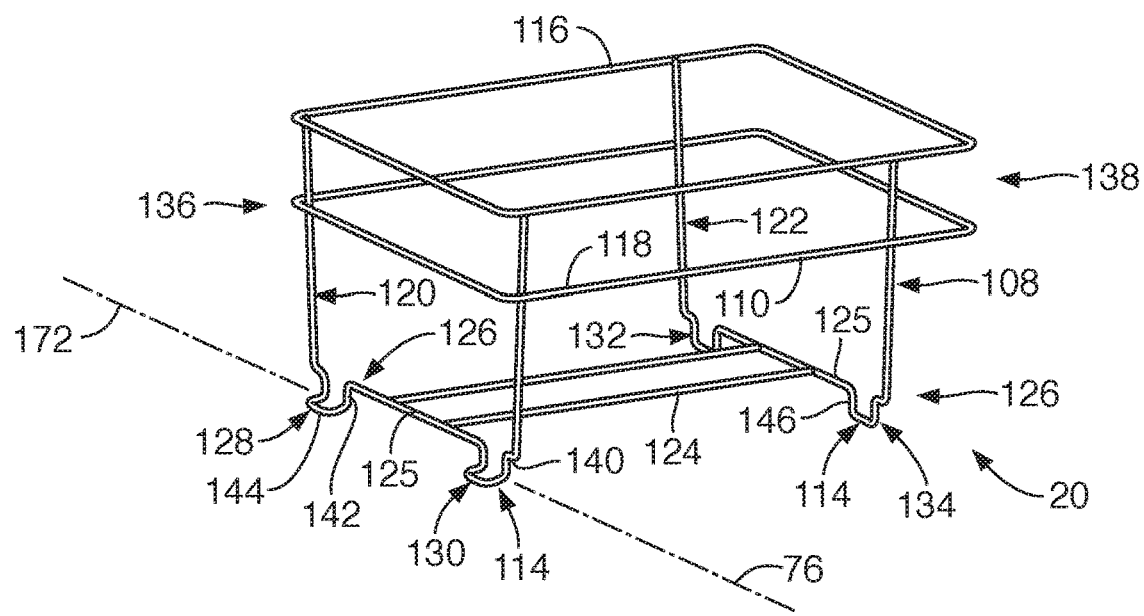
Figure 4:
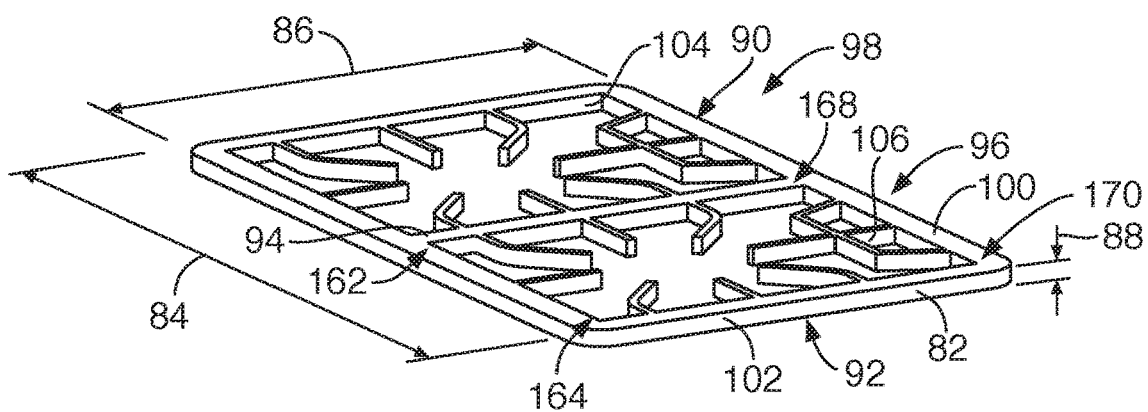

Now with reference to FIG. 4, an exploded view of the grate 18 (shown without the range portion 16 of the cooking station 10 for simplification purposes), the cage 20 and the receptacle 22 is provided. In one embodiment, the grate 18 may be sized and configured to be positioned over the upper edge 40, or adjacent to the upper edge 40, of the range portion 16 of the main body 12 (as depicted in FIG. 1). For example, the grate 18 may define an outer peripheral surface 82 extending with a grate length 84, a grate width 86, and a grate height 88. The grate length 84 and grate width 86 may extend with a rectangular profile such that the grate length 84 may be elongated relative to the grate width 86 or, alternatively, the grate 18 may exhibit a square profile, depending on the dimensions of the range portion 16 of the main body 12. The grate height 88 may extend shorter than the grate length 84 and width 86 so that the grate extends with a relatively thin and flat profile. In this manner, the grate 18 may define two length portions 90 and two width portions 92 each defining a portion of the outer peripheral surface 82, the two length portions 90 extending substantially parallel relative to each other and the two width portions 92 extending parallel relative to each other. Further, the grate 18 may include a middle portion 94 extending between the oppositely extending length portions 90 so as to define a front grate portion 96 and a rear grate portion 98 to correspond with front and rear heating elements or second heating elements 50 (FIG. 3). Each of the length portions 90, width portions 92, and the middle portion 94 may define an upward facing surface 100 and an underside surface 102 (see FIGS. 5 and 6), the upward facing surface being a top side of the grate 18. The underside surface 102 may be an oppositely facing surface relative to the upward facing surface 100 or may be any surface along the underside of the grate 18. Further, the length portions 90, the width portions 92 and the middle portion 94 may each define an inner surface 104, which may be any surface generally extending parallel with one side of the outer peripheral surface 82 or any inward facing surface between the upward facing surface 100 or underside surface 102 of the grate 18. The grate 18 may also include several extension portions 106 extending inward from the inner surface 104 of the length portions 90, width portions 92, and the middle portion 94 of the grate 18. Such extension portions 106 may provide structure to support the receptacle 22 or a pot or pan thereon to be heated over one or both of the range heating elements. Further, in one embodiment, the inner surface 104 and the underside surface 102 of the grate 18 may be sized and configured to cooperate with portions of the cage 20, so that the cage 20 can be coupled to the grate 18, as will be discussed in further detail herein.

The cage 20 may include a frame structure 108 sized and configured to hold and support the receptacle 22 therein. In one embodiment, the frame structure 108 may extend with horizontal and vertical frame components 110, 112, upon the cage being oriented in a use-state position, and may include base extensions 114 sized and configured to cooperate with the grate 18. For example, the frame structure 108 may include a first loop 116 and a second loop 118 each extending with a rectangular configuration, the first and second loops 116, 118 each extending within a separate plane that may extend substantially parallel relative to each other. The first loop 116 may extend above the second loop 118 such that the first loop 116 may define a top side of the cage 20 and the second loop 118 may extend along a mid portion of the cage 20. The frame structure 108 may also extend to define a first u-shaped structure 120 and a second u-shaped structure 122 each including the horizontal frame components 110, such as a horizontal base component 125, and vertically extending frame components or vertical frame components 112 extending to define a general u-shape. The vertically extending frame components of the first u-shaped structure 120 may be coupled, via welding or the like, to bends of the first and second loops 116, 118 such that the vertically extending frame components extend adjacent a first side 136 of the first and second loops 116, 118 of the cage 20. The vertically extending frame components of the second u-shaped structure 122 may be coupled to linear lengths of the first and second loops 116, 118 such that the first and second loops extend beyond the vertically extending frame components so that a second side 138 of the cage 20 and the first and second loops 116, 118 may be separated from the vertically extending frame components of the second u-shaped structure 122. Further, the horizontal base component 125 of the first and second u-shaped structures 120, 122 may be coupled by two linear extending floor frame components 124 extending parallel relative to each other. Such linear floor frame components 124 may be horizontal extending frame components sized and configured to support an underside surface of the receptacle 22.

In one embodiment, the base extensions 114 of the cage 20 may extend from a base portion 126 of the cage 20 and may be sized and configured to cooperate with the grate 18 such that movement of the cage 18 may be minimized. Such base portion 126 of the cage 20 may be defined by, for example, the horizontal base components 125 or lower end portions of the vertically extending components of the first and second u-shaped structures 120, 122. For example, the base extensions 114 may include a first base extension 128, a second base extension 130, a third base extension 132 and a fourth base extension 134. The first and second base extensions 128, 130 may extend from the first side 136 of the base portion 126 of the cage 20. Similarly, the third and fourth base extensions 132, 134 may extend from the second side 138 (opposite from the first side 136) of the base portion 126 of the cage 20. Further, the first and second base extensions 128, 130 may be sized and configured to extend along both the inner surface 104 and the underside surface 102 of the grate 18 to minimize upward and lateral movement of the first side 136 of the cage 20. Also, the third and fourth base extensions 132, 134 may be sized and configured to extend along the inner surface 104 of the grate 18 to minimize lateral movement of the second side 138 of the cage 20.

In one embodiment, the first and second base extensions 128, 130 may extend from the lower end portion of a respective one of the vertically extending components of the first u-shaped structure 120. In another embodiment, the first and second base extensions 128, 130 may extend from the horizontal base component 125 of the first u-shaped structure 120. In another embodiment, the first and second base extensions 128, 130 may exhibit a bent u-shaped structure to define a vertical portion and a horizontal portion of the first and second base extensions 128, 130, the vertical and horizontal portions extending generally orthogonal relative to each other. Such bent u-shaped structure may also exhibit a foot-like structure. In another embodiment, each of the first and second base extensions 128, 130 may each extend with a first segment 142 and a second segment 144 with a bend therebetween, the first segment 142 being generally orothogonal relative to the second segment 144. Upon the cage 20 being positioned in a use position or use state, the first segment 142 may be a vertically extending portion of the first and second base extensions 128, 130 and the second segment 144 may be a horizontally extending portion of the first and second base extensions 128, 130. The first segment 142 may be sized and configured to extend along the inner surface 104 of the grate 18 and the second segment 144 may be sized and configured to extend alongside the underside surface 102 of the grate 18. The first segment 142 and second segment 144 may include one or more structural lengths associated therewith. Further, in another embodiment, each of the base extensions 114 of the cage 20 may include an underside ledge 140 that may be sized and configured to be positioned over the grate 18 so as to sit on the upward facing surface 100 of the grate 18. Such underside ledge 140 may exhibit bends in the respective base extensions 114 so that the underside ledge 140 extends outward from the lower portion of the vertically extending components of the first u-shaped structure 120 and extends generally orthogonal relative to the first segment 142 of the first and second base extensions 128, 130. In another embodiment, the first and second base extensions 128, 130 may be continuous, homogeneous, monolithic, and/or seamless structures relative to the first u-shaped structure. In this manner, the first and second base extensions 128, 130 may be sized and configured to minimize upward and lateral movement of the first side 136 of the cage 20 so as to cooperate with and be removable coupled to the grate 18.

In another embodiment, the third and fourth base extensions 132, 134 may extend from the lower end portion of a respective one of the vertically extending components of the second u-shaped structure 122. In another embodiment, the third and fourth base extensions 132, 134 may extend from the horizontal base component 125 of the second u-shaped structure 122. In another embodiment, the third and fourth base extensions 132, 134 may exhibit a u-shaped configuration. In another embodiment, the third and fourth base extensions 132, 134 may exhibit a vertical extension portion 146 or component or a portion that extends away from or vertically downward from the cage 20 (vertically downward relative to the cage 20 being oriented in a use-state position). Such vertical extension portion 146 of the third and fourth base extensions 132, 134 may be sized and configured to extend alongside the inner surface 104 of the grate to minimize lateral movement of the second side 138 of the cage 20. Further, as previously set forth, each of the base extensions 114 may include the underside ledge 140 that may be sized and configured to be positioned over the grate 18 so as to sit on the upward facing surface 100 of the grate 18. Further, the underside ledge 140 may exhibit bends in the respective base extensions 114 so that the underside ledge 140 extends generally orthogonal relative to the vertical extension portion 146 of the third and fourth base extensions 132, 134, the underside ledge 140 extending outward from the lower portion of the second u-shaped structure 122. In another embodiment, the third and fourth base extensions 132, 134 may be continuous, homogeneous, monolithic, and/or seamless structures relative to the second u-shaped structure 122.

As previously set forth, the receptacle 22 may be sized and configured to be supported within the cage 20 and to hold a cooking fluid therein. In one embodiment, the receptacle 22 may extend with an upstanding wall 148 and a floor 150, the upstanding wall 148 extending to a lip portion 152. The lip portion 152 may extend transversely outward relative to the upstanding wall 148 so as to be sized and configured to extend beyond and over the upper loop or first loop 116 of the cage 20. The receptacle 22 may include an open side or open end 154. Further, in another embodiment, the receptacle 22 may receive a lid (not shown) thereover. The receptacle 22 may be made of a metallic material or any other material, such as a polymeric material that can withstand high temperatures. In another embodiment, the receptacle may be formed of both a metallic and polymeric material.

Figure 5:
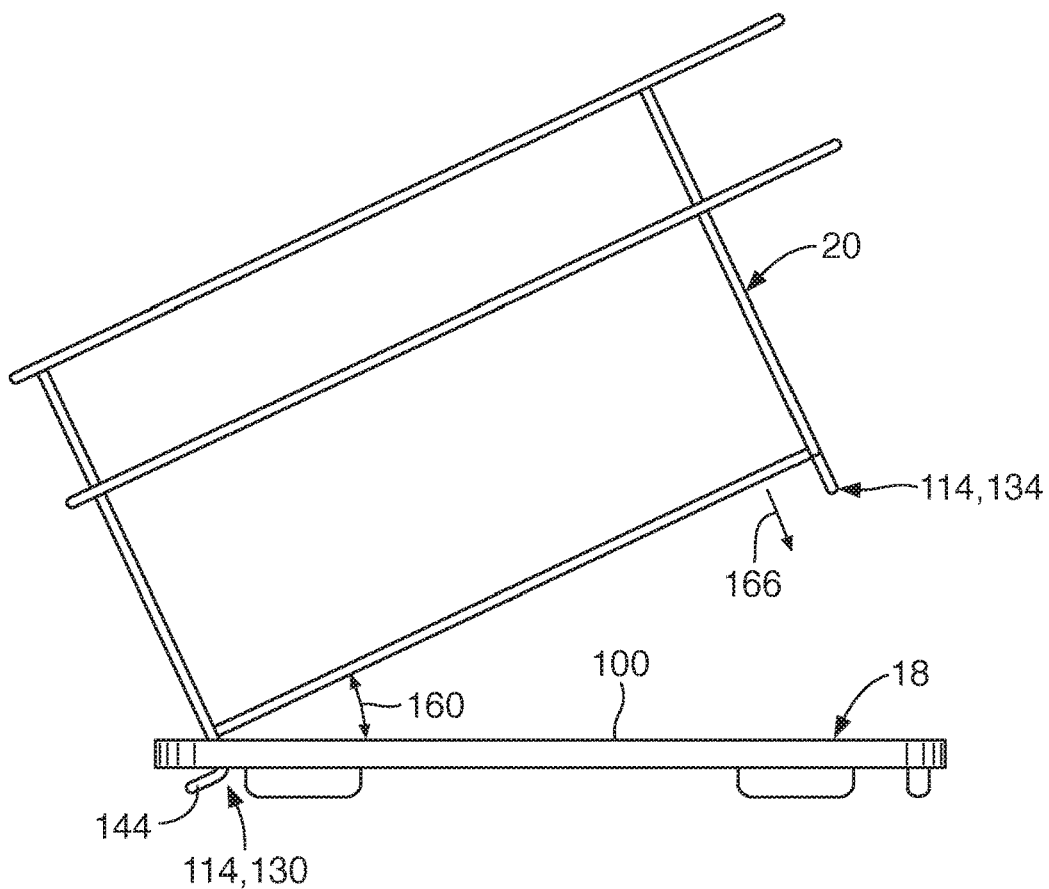
FIG. 5 is a side view of the cage and the grate, depicting the cage oriented in a pre-positioned state prior to coupling the cage to the grate, according to another embodiment of the present invention.

Now with reference to FIGS. 4 and 5, the cage 20 may be removably coupled to the grate 18 with the base extensions 114. For example, to couple the cage 20 to the grate 18, the cage 20 may be oriented at an angle 160, as depicted in FIG. 5, so that the underside ledge 140 of the first and second base extensions 128, 130 may be positioned over the upward facing surface 100 of the grate 18 adjacent first and second inner corners 162, 164 (see also FIG. 7) of the grate 18 along a first side of the grate 18 with a portion, e.g., the second segment 144 of the base extensions 114, positioned under the grate 18 adjacent the first and second inner corners 162, 164. Once the underside ledge 140 of the first and second base extensions 128, 130 is so positioned, the cage 20 may be pivoted downward, as indicated by arrow 166, so that the vertical extension portion 146 of the third and fourth base extensions 132, 134 is positioned alongside the inner surface 104 of the grate 18 with the underside ledge 140 positioned on the upward facing surface 100 of the grate 18 adjacent third and fourth inner corners 168, 170 of a second side of the grate 18. Similarly, upon the cage being pivoted downward, the first segment 142 of the first and second base extension 128, 130 may be vertically oriented so as to extend alongside the inner surface 104 of the grate 18 adjacent the first and second inner corners 162, 164 of the grate 18.

Figure 6:
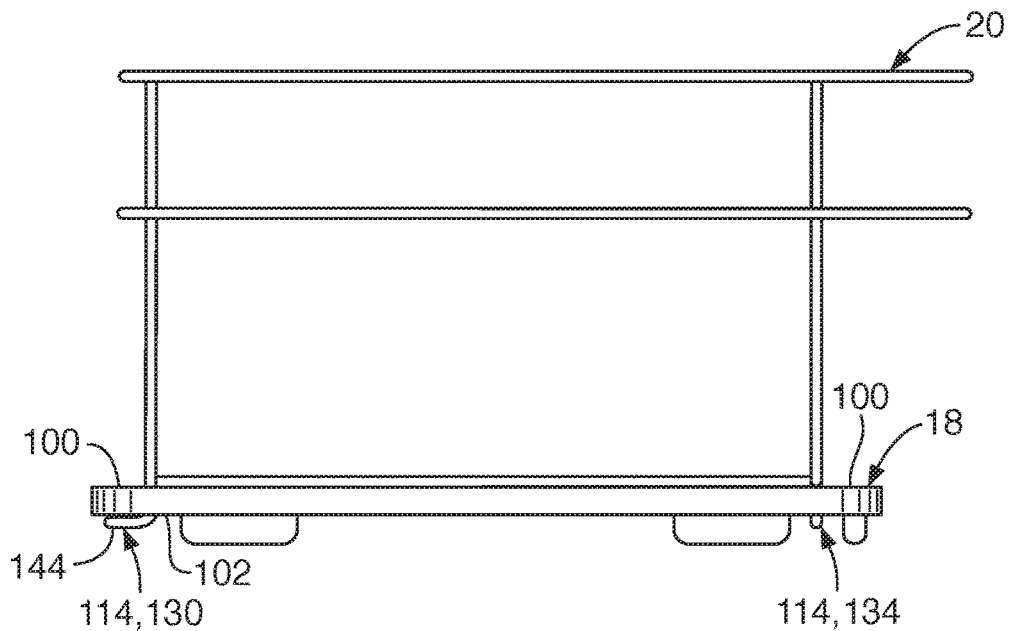
FIG. 6 is a side view of the cage coupled to the grate in a use-state, depicting base extensions extending alongside an underside surface of the grate, according to another embodiment of the present invention.
Figure 7:
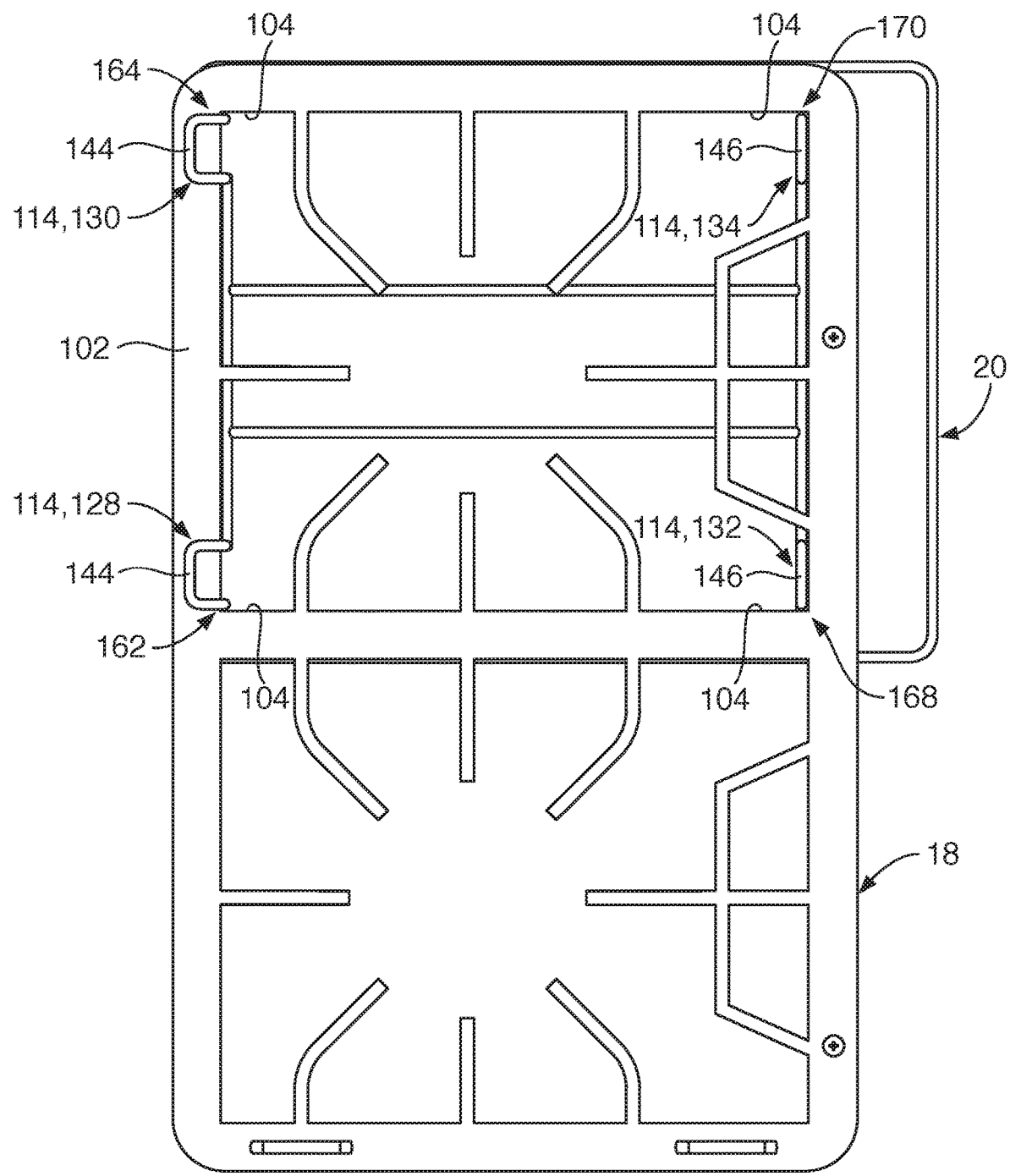
FIG. 7 is a bottom view of the cage coupled to the grate, depicting the base extensions extending alongside an inner surface of the grate and the underside surface of the grate, according to another embodiment of the present invention.

With reference to FIGS. 4, 6 and 7, upon coupling the cage 20 to the grate 18 in the use-state or use-position (oriented as depicted in FIG. 6), the second segment 144 of the first and second base extensions 128, 130 may extend alongside the underside surface 102 of the grate 18. Further, the first and second base extensions 128, 130 may be sized so that the first segment 142 or vertical component of the first and second base extensions 128, 130 extends alongside the inner surface 104 of the grate 18 and adjacent the first and second inner corners 162, 164 along the first side of the grate 18. Similarly, the vertical extension portion 146 of the third and fourth base extensions 132, 134 extends alongside the inner surface 104 of the grate 18 and adjacent the third and fourth inner corners 168, 170 along the second side of the grate 18.

Figure 8:
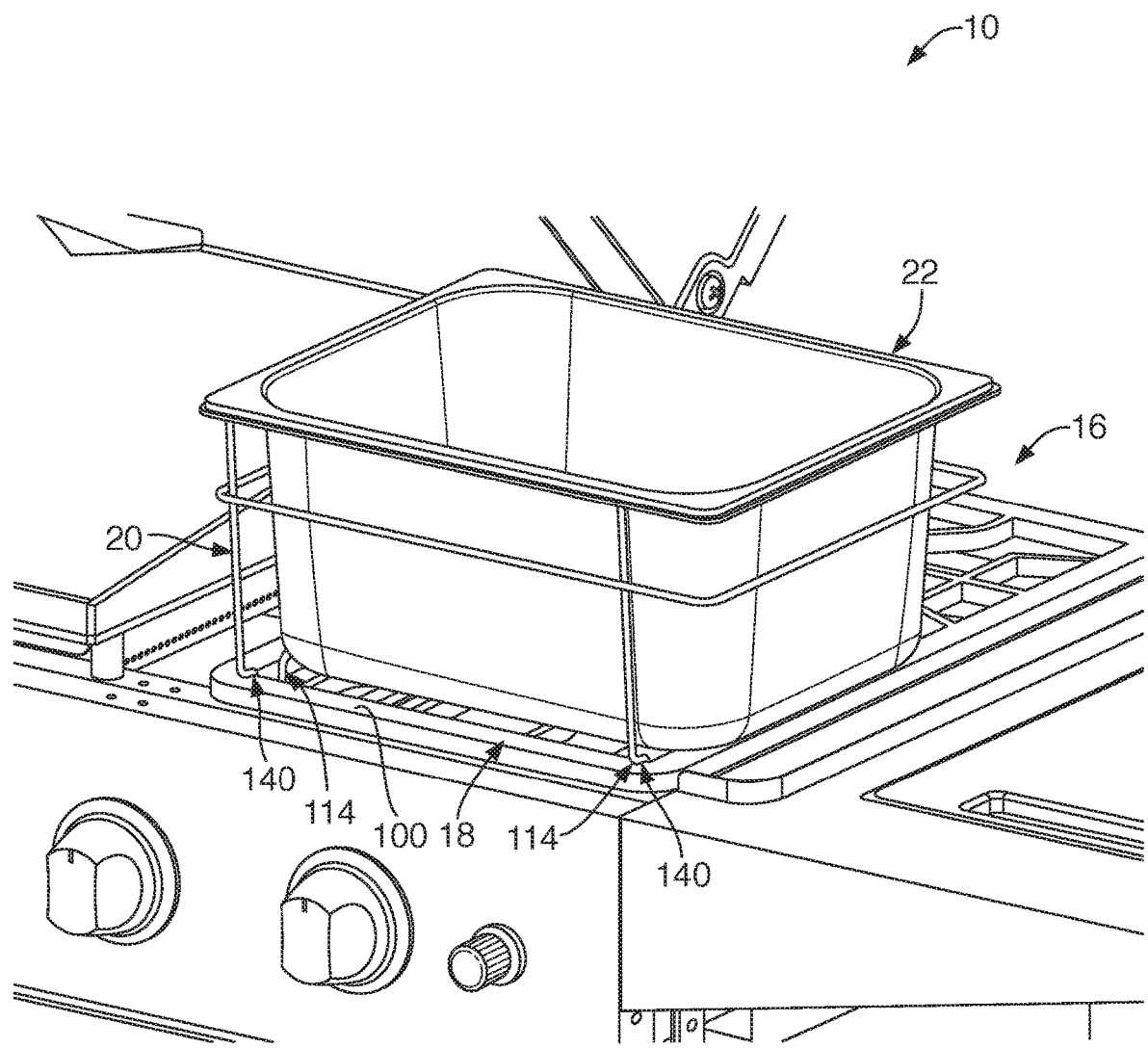
FIG. 8 is an enlarged partial perspective front view of the range portion of the cooking station, depicting the receptacle positioned within the cage in the use-state, according to another embodiment of the present invention.

Further, with reference to FIGS. 4 and 8, each of the base extensions 114 may include the underside ledge 140 to rest over the upward facing surface 100 (see also FIG. 6) of the grate 18 and adjacent a corresponding inner corner of the grate 18. In this manner, the cage 20 may cooperate with and be coupled to the grate so as to minimize lateral movement of the cage 20 relative to the grate 18 (via the first segment 142 of the first and second base extensions 128, 130 and the vertical extension portion 146 of the third and fourth base extensions 132, 134) and minimize upward movement of the cage 20 relative to the grate 18 (via the second segment 144 of the first and second base extensions 128, 130). In other words, the cage 20 may be limited to a pivoting movement, opposite downward arrow 166 (FIG. 5), for removal of the cage 20 from the grate 18 so as to generally pivot or rotate about an axis 172 (FIG. 4) defined through or adjacently along both the first and second base extensions 128, 130 so that the cage 20, upon being pivoted, may be lifted away from the grate 18. As depicted in FIG. 8, upon the cage 20 being positionably coupled with the grate 18, the receptacle 22 may then be positioned within the cage 20 for receiving a cooking fluid (not shown) within the receptacle 22. The cooking fluid may then be safely heated with the range portion 16 of the cooking station 10 such that the cage 20 is removably coupled to the grate 18 in a stable manner, as previously set forth, so that the cage 20 may be maintained in the use-position without side-to-side or lateral movement and only removed from the grate 18 upon being rotated about the axis 172 along the first and second base extension 128, 130. In this manner, the cage 20 may be coupled to the grate 18 so that the cage 20 may be employed with the receptacle 22 to safely deep fry food with the range portion 16 while also cooking food with the griddle portion 14 of the cooking station 10.

The various structural components of the various embodiments of the main body 12 of the cooking station 10 and any other structural components thereof may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor cooking station for heating a cooking fluid, comprising:
   a main body including one or more heating elements supported by the main body, the main body including an upper portion sized and configured to support a grate, the grate positioned over the upper portion so as to be disposed above the one or more heating elements;
   a receptacle sized to be positioned above the grate; and
   a cage sized and configured to cooperate with and be positioned over the grate in a use-state, the cage including vertically and horizontally extending components configured to hold the receptacle within the cage, the cage including a base portion with base extensions each extending downward from the base portion such that the base extensions, in the use-state, are sized and configured to extend along an inner surface of the grate with two of the base extensions sized and configured to extend along an underside surface of the grate.

2. The outdoor cooking station of claim 1, wherein, upon the cage being positioned over the grate in the use-state, the cage is minimized to initial movement relative to the grate to generally pivot about an axis defined along the two of the base extensions.

3. The outdoor cooking station of claim 1, wherein, upon the cage being positioned over the grate in the use-state, the base extensions extend along the inner surface and the underside surface of the grate to minimize movement of the cage relative to the grate.

4. The outdoor cooking station of claim 1, wherein the base extensions each extend to define an underside ledge, the underside ledge sized and configured to be positioned over an upward facing surface of the grate.

5. The outdoor cooking station of claim 1, wherein the base extensions and the base portion of the cage are a monolithic, seamless structure.

6. The outdoor cooking station of claim 1, wherein the upper portion of the main body extends to support a griddle member thereon.

7. The outdoor cooking station of claim 1, wherein the upper portion of the main body extends to support the grate and a griddle member thereon in a side-by-side manner.

8. The outdoor cooking station of claim 7, wherein the main body comprises a first side shelf and a second side shelf attached to respective opposite first and second sides of the main body, the first side shelf positioned adjacently alongside the griddle member, the second side shelf positioned adjacently alongside the grate.

9. The outdoor cooking station of claim 1, wherein the grate sits along the upper portion of the main body to define a range cook surface.

10. The outdoor cooking station of claim 1, wherein the main body comprises at least two wheels adjacent a bottom end of the main body to facilitate portability of the main body.

11. An outdoor cooking station with a main body including one or more heating elements supported by the main body, the main body including an upper portion sized and configured to support a grate such that the grate is positioned over the upper portion so as to be disposed above the one or more heating elements, the outdoor cooking station comprising:
   a receptacle sized to be positioned above the grate;
   a cage sized and configured to cooperate with and be positioned over the grate in a use-state, the cage including vertically and horizontally extending components configured to hold the receptacle within the cage, the cage including a base portion with base extensions each extending downward from the base portion such that the base extensions, in the use-state, are sized and configured to extend along an inner surface of the grate with two of the base extensions sized and configured to extend along an underside surface of the grate.

12. The outdoor cooking station of claim 11, wherein, upon the cage being positioned over the grate in the use-state, the cage is minimized to initial movement relative to the grate to generally pivot about an axis defined along the two of the base extensions.

13. The outdoor cooking station of claim 11, wherein, upon the cage being positioned over the grate in the use-state, the base extensions extend along the inner surface and the underside surface of the grate to minimize movement of the cage relative to the grate.

14. The outdoor cooking station of claim 11, wherein the base extensions each extend to define an underside ledge, the underside ledge sized and configured to be positioned over an upward facing surface of the grate.

15. The outdoor cooking station of claim 11, wherein the base extensions and the base portion of the cage are a monolithic, seamless structure.

16. A method for heating a fluid on an outdoor cooking station, the method comprising:

providing a main body including one or more heating elements supported by the main body, the main body including an upper portion sized and configured to support a grate, the grate positioned over the upper portion so as to be disposed above the one or more heating elements;

positioning a cage to cooperate with the grate in a use-state so that base extensions of a base portion of the cage extend along an inner surface of the grate with two of the base extensions extending along an underside surface of the grate;

positioning a receptacle within the positioned cage such that the cage includes vertically and horizontally extending components for holding the receptacle within the cage; and heating the fluid within the receptacle with the one or more heating elements.

17. The method according to claim 16, wherein the positioning the cage comprises minimizing movement of the cage in the use-state relative to the grate to generally pivot about an axis defined along the two of the base extensions.

18. The method according to claim 16, wherein the positioning the cage comprises positioning the cage in the use-state with the base extensions extending along the inner surface and the underside surface of the grate to minimize movement of the cage relative to the grate.

19. The method according to claim 16, wherein the providing comprises providing a griddle member to be supported on the upper portion of the main body adjacent the grate in a side-by-side manner.

20. The method according to claim 16, wherein the providing comprises providing a first side shelf and a second side shelf secured to respective opposite first and second sides of the main body such that an upward facing surface of the first and second side shelves is substantially level with an upper end of the upper portion of the main body.

\* \* \* \* \*